United States Patent [19]

Wichterle

[11] Patent Number: 4,666,267
[45] Date of Patent: May 19, 1987

[54] PERFORATED SOFT CONTACT LENS AND A METHOD FOR MANUFACTURING THEREOF

[75] Inventor: Otto Wichterle, Praha, Czechoslovakia

[73] Assignee: Ceskoslovenska akademie ved, Czechoslovakia

[21] Appl. No.: 684,861

[22] Filed: Dec. 21, 1984

[30] Foreign Application Priority Data

Dec. 30, 1983 [CS] Czechoslovakia ............ PV 10208-83

[51] Int. Cl.⁴ .................................................. G02C 7/04
[52] U.S. Cl. .................................. 351/160 H; 351/162; 351/177
[58] Field of Search ................ 351/160 R, 160 H, 161, 351/162, 177

[56] References Cited

U.S. PATENT DOCUMENTS 4,157,864 6/1979 Koller et al. ..................... 351/160 R
4,211,476 7/1980 Brummel et al. ................ 351/160 R

FOREIGN PATENT DOCUMENTS 1276003 6/1972 United Kingdom ............ 351/160 R

OTHER PUBLICATIONS

Neefe Optical Laboratory (Advertisement), *Contacto*, Nov. 1975.
Groppi, J. J., "New Aspects in the Fitting of Multi--Range ® Bifocal Contact Lens", *Contacto;* vol. 15, No. 2; June, 1971.
Neill, J. C., "Electronic Venting of Corneal Contact Lenses", *Contacto;* vol. 11, No. 2; pp. 9–11, June 1967.

*Primary Examiner*—John K. Corbin
*Assistant Examiner*—Scott J. Sugarman
*Attorney, Agent, or Firm*—Leydig, Voit, Mayer

[57] ABSTRACT

A perforated soft contact lens which has at least one perforation formed inside the optical zone of lens, i.e. in the distance 0 to 3.5 mm from the lens center. It is manufactured by placing the lens in a swollen state with its inner surface on an elastic base and pressing a punch perpendicularly to the outer surface. Further possible method of manufacturing consists in sticking the soft hydrophilic lens on a hard base, drying and then drilling the openings, advantageously to the first contact of a drill with the base.

5 Claims, 5 Drawing Figures

PERFORATED SOFT CONTACT LENS AND A METHOD FOR MANUFACTURING THEREOF

The invention pertains to a perforated soft contact lens and a method for manufacturing thereof.

In addition to the required perfect optical performance and a minimum of mechanical irritation, contact lenses should hinder the metabolism of cornea as little as possible to extend their period of continuous wearing without danger of temporary or even lasting unfavorable consequences for eye tissues. The last mentioned condition is attained, at least in part, with soft lenses made of strongly swollen hydrophilic gels, which are relatively well permeable for oxygen and other low-molecular-weight water-soluble metabolites, or with soft lenses made of rubbery silicon polymers, which are at least perfectly permeable for oxygen. However, tear liquid is not changed in a thin liquid film between eye and any of the soft lenses which are always perfectly sucked to the eye surface, so that the transport of metabolites from and to the surface of cornea is limited only to the diffusion mechanism. Consequently, components, which are insoluble in the material of lens and cannot spontaneously penetrate through it, are excluded from this transport. Such components are, e.g., the components of higher molecular weight for hydrophilic-gel lenses and all metabolic components, except oxygen and carbon dioxide, for silicon lenses. These facts represent the most serious shortcoming of soft contact lenses and the only disadvantage in comparison to hard lenses, which never adhere so perfectly to eye as soft lenses and thus enable a relatively good exchange of tear liquid under them during an eye movement. Indeed, the hard lenses cannot compete with soft lenses in the comfort of wearing.

To achieve the direct exchange of tear liquid also with soft lenses, attempts were done with their perforation ("fenestration") without obtaining any important effect. The peforation was always performed outside the optical zone of lens to not impede its optical performance. This failure may be explained by means of the calculated pressure relations under soft lenses (K. Wichterle and O. Wichterle; Lecture at the International Conference on Contact Lenses, Venice, March 1983), which showed that the pressure almost equal zero or even a small overpressure occured at the places where the perforation had been formerly performed. It may be understood, that tear liquid cannot enter under the lens through this perforation.

The invention pertains to a perforated soft contact lens, which has at least one opening performed inside the optical zone of lens, i.e. in the distance of 0 to 3,5 mm from the lens carrier.

Advantageously the opening is of circular section has the diameter 0,2 to 1,5 mm and is located in the area of the center of the lens.

The scattering of light on the walls of opening may be excluded by dark dyeing or pigmenting of walls. The pigmenting with black, completely insoluble silver sulfide, which precipitates under the surface of hydrophilic gel of which is the lens made after impregnation of the gel with an aqueous or ammonia solution of a silver salt and the subsequent exposure to hydrogen sulfide or soluble sulfides, is particularly suitable.

Penetration of undesired rays through the dark-pigmented opening can be further reduced by a strong narrowing of the opening on the inner side of lens, i.e. by the opening with a funnel shape. Such shaping of the opening can be obtained during machining of the gel lens in a dry state in such a way, that the lens is allowed to adhere to a hard base by its inner surface and, after drying, a fine drill is forced only to such depth that it just passes to the base through the smallest opening.

The opening of funnel shape can be obtained also by perforation of a soft lens with a punch, if the punch is forced through the outer surface of lens which rests on a soft base.

Openings in the pupil area of eye have not a substantial influence on the sharpness of vision, because the area of opening occupies only a small fraction of the eye aperture. This is for the diameter of opening as large as 1 mm only one ninth of the area of pupil with diameter 3 mm and this fraction is even smaller for a larger aperture of pupil or for a smaller diameter of opening. In a diffused light without extreme contrasts, no difference at all can be observed in visual perception comparing the vision through a lens with and without perforation. First by viewing dark objects near an intense light, an evenly scattered weak light from refraction on the opening and the liquid inside it is visible at the dark background. This defect can be substantially reduced or almost completely removed by the above said adaptations of the opening, which are further objectives of this invention.

A striking positive effect of the lens according to the invention may be explained by the calculations. It is characterized by perforations very near to the center of lens, where a maximum underpressure is created under soft lenses of the common type and enables suction of a significant amount of tear liquid under the lens. No substantial deterioration of the optical performance of lens occurs at the same time, in contrast to the a priori expected effect. Considering that the pumping mechanism of the described perforated lenses provides qualitatively and quantitatively more perfect exchange of metabolites than the diffusion mechanism, the lenses determined for perforation need not to be made ultrathin and from highly hydrated gels. Also gels with the content of water less than 40% can be successfully used, as e.g. copolymers of 2-hydroxyethyl methacrylate with butyl methacrylate.

Some of possible embodiments of the invention are schematically illustrated by following drawings.

Figure 1:
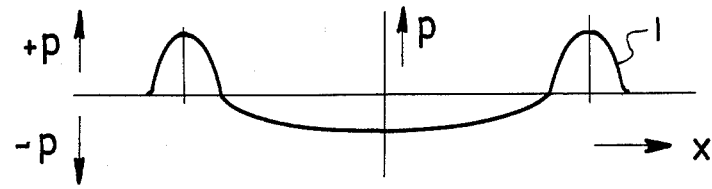
FIG. 1 shows the dependence of pressure p and underpressure $-p$ caused by a soft lens adhering to eye on the distance x from the lens axis.

The curve 1 in FIG. 1 shows the course of pressure in tear liquid which fills the space between the lens 2 from hydrophilic gel and the surface of eye in the plane passing through the lens axis. It shows that the underpressure arises in the central part of lens adhering to the eye surface and turns to an overpressure in the region of circumference ring of lens in the direction of distance x from the lens axis.

Figure 2:
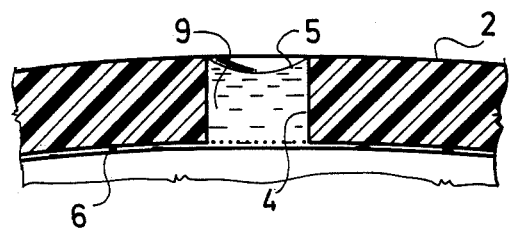
FIG. 2 is a sectional view on the opening placed near the lens center (i.e. in the place of maximum underpressure under the lens), with the meniscus of tear liquid.

FIG. 2 shows the cross-sectional view on the lens 2 from hydrophilic gel, which adhers by its inner concave surface to the surface of eye cornea 6 and is provided with an opening 4 near the center of lens 2, i.e. in the place of maximum underpressure according to curve 1. The tear liquid 9 is accumulated in the opening 4 and forms there the meniscus 5. The meniscus is formed immediately after any pushing of the lens to eye by the eyelid motion and the opening 4 is flooded with tear liquid 9 at the same time.

Figure 3:
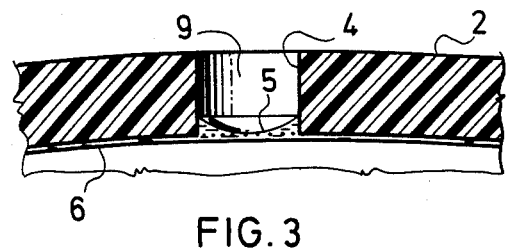
FIG. 3 shows sinking of the tear meniscus down to the cornea surface.

FIG. 3 is the sectional view on the meniscus 5 which sank down to the surface of eye cornea 6. This occurs if the meniscus 5 formed under the adhering lens is deeper than corresponds to the shape of hemisphere.

Figure 4:
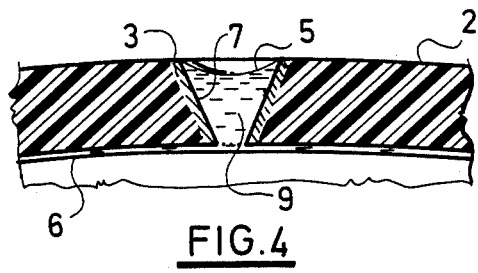
FIG. 4 shows the shape of opening resulting by forcing a punch into the lens resting by its inner surface on a soft base.

FIG. 4 shows the cross-sectional view on the lens 2 with a funnel-shaped opening 7. A dark pigmentation 3 on the surface of funnel opening 7, which absorbs most of the light scattered by the formed meniscus 5 of tear liquid 9, is indicated by fine hatching. The opening 7 can be best shaped by means of a punch if the lens 2 is allowed to adhere to a soft base by its inner concave surface. The lens 2 is deformed by the pressure of punch in such a way, that the cut material is strongly expanded in the direction of the inner surface of lens 2 and the opening 7 contracts on the inner side after this operation to a diameter substantially smaller than is the diameter of opening 7 on the outer side of lens 2.

Figure 5:
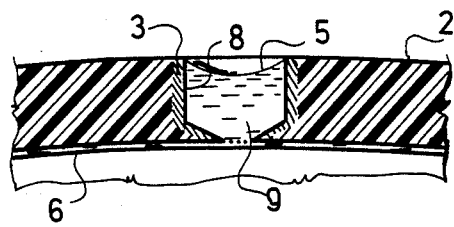
FIG. 5 shows another embodiment, of the funnel shape of opening made in a dried lens resting by its inner surface on a hard base by drilling only to the first contact of a drill with the hard base.

FIG. 5 shows a sectional view on the opening 7 in the lens 2 which is provided with a short funnel-shaped part and a pigmentation 3. The opening was shaped during the mechanical working of lens 2 from a gel material which was in the dry state. The lens 2 was allowed to adhere to a hard base by its inner surface, dried and then drilled to such a depth that a drill just penetrated into the hard base by its smallest diameter. In connection with the pressure relations between the inner surface of lens 2 and the surface of cornea 6, the function of the soft gel lens 2 with the opening 4, 7 can be described as follows:

Observation of a centrally set perforated lens reveals that tear liquid almost instantaneously falls inside the opening at every eyelid twinkle, which is manifested, according to the pressure interaction of the lens with eye and the size of opening, in formation of a concave spherical meniscus inside the opening or even in uncovering the surface of cornea under the opening. These relations can be quantitatively described, if the value of underpressure in the center of set lens, the diameter of opening, and surface pressure of lears are known.

The condition required for suction off the whole space of perforation is $$d > [(4000F)/p],$$

where d is the diameter of circular opening in millimeters, F is the surface pressure of tear liquid in N/m (equal approx. 0.05 N/m), and p is the central underpressure under the lens in Pa. Thus, the condition which has to be approximately met is $$d > (200/p).$$

The total volume sucked under the lens of thickness t, if the above condition is satisfied, is $$\tfrac{1}{4}\pi d^2 t.$$

If the diameter of opening is smaller than requires the above condition, only the amount of tear liquid is sucked off, which corresponds to a meniscus suspended on the outer edge of opening. The following relationships hold between the angle δ included by the meniscus and the wall of opening, its depth y, volume V of meniscus, and the variables d, p and F:

$$\cos \delta = \frac{dp}{4000\,F}, \quad y = \frac{d}{\cos \delta}(1 - \sin \delta), \quad V = \pi R y^2 - (\pi y^3/3).$$

Thus, it can be expected that about 0,04 microliters is sucked under the lens at the opening diameter 0,75 mm and underpressure 200 Pa, which amount is sufficient for wetting a large area of cornea because the liquid film has a thickness probably only in micrometers. This volume will wet the cornea surface 40 mm$^2$ at the film thickness of one micrometer.

A movement of eyelid is enough to squeeze out all excessive liquid under the lens. It is almost improbable, that the sucked liquid is returned through the perforation outside the lens, because the place of permanent underpressure is concerned. Therefore, it can be assumed that the excess of liquid is pressed by an eyelid movement to the circumference of lens and passes from there above conjunctive, similarly as through a non-return valve.

Opening 4, 7 provided in the lens 2 in the pupil area of eye have not a substantial influence on the sharpness of vision, because the area of opening 4, 7 ocupies only a small fraction of the eye aperture. This is for the diameter of opening 4, 7 as large as 1 mm only one ninth of the area of pupil with diameter 3 mm and this fraction is even smaller for a larger aperture of pupil or for a smaller diameter of opening 4, 7. In a diffused light without extreme contrasts, no difference at all can be observed in visual perception comparing the vision through a lens 2 with and without perforation. First by viewing dark objects near an intense light, an evenly scattered weak light from refraction on the opening 4 and the liquid inside it is visible at the dark background. This defect can be substantially reduced or almost completely removed by said adaptations of the opening 7, which are further objectives of this invention.

The scattering of light on the walls of opening 7 may be excluded by dark dyeing or pigmenting of walls. The pigmenting with black, completely insoluble silver sulfide, which precipitates under the surface of hydrophilic gel after impregnation of the gel with an aqueous or ammonia solution of a silver salt and the subsequent exposure to hydrogen sulfide or soluble sulfides, is particularly suitable. After impregnation with silver salts, elemental silver can be also precipitated on the surface or under the surface of gel by reducing agents or a contact with a less noble metal, e.g., by insertion a brass wire into the impregnated opening 4. Another suitable procedure consists in the impregnation with complex compounds of bismuth (III) followed by reduction of a black, finely dispersed elemental bismuth.

Penetration of undesired rays through the dark-pigmented opening can be further reduced by a strong narrowing of the opening on the inner side of lens 2, i.e. by the opening 7 with a funnel shape.

Although the underpressure of a correctly chosen type of soft lens is always highest under the lens 2 center, it can be derived from the calculated pressure dependences that it decreases first only slowly in the direction to the edge, so that, e.g., it still amounts 50 to 90% of the maximum central value in the distance about 3 mm from the center, and first in a larger distance from the center it quickly drops to zero. Therefore, a satisfactory pumping effect may be attained also with one opening 4, or advantageously with more (e.g., three or four) openings 4, placed as far on the edge of optical zone. Although one of the openings 4 always arives to the region of pupil during the movement of lens on eye, its disturbing effect on the optics is completely negligible because it affects only the regions of retina distanced from fovea centralis and even there the effect is only slight when the above described adaptation of opening 7 has been used. The perforation at the edge of optical zone is particularly advantageous for ultrathin negative lenses, because it is performed in the place of increased thickness of the lens 2 which enables suction of a larger volume at each movement of eyelid. On the contraty, the central perforation is more suitable for extremely strong positive lenses, because the largest thickness is in the center and enables to suck a relatively lerge volume and also perfectly shields the undesired rays.

Considering that the pumping mechanism of the described perforated lenses provides qualitatively and quantitatively more perfect exchange of metabolites than the diffusion mechanism, the lenses determined for perforation need not to be made ultrathin and from highly hydrated gels. Also gels with the content of water less than 40% can be successfully used, as e.g. copolymers of 2-hydroxyethyl methacrylate with butyl methacrylate.

What I claimed is:

1. In a soft contact lens the improvement which comprises at least one perforation through the lens within the optical zone thereof, located substantially in the center of the lens, the perforation being of circular cross-section having a diameter of 0.2 to 1.5 mm and being larger in cross-section at the outer convex surface and narrowing to a smaller cross-section at the inner concave surface of the lens and wherein the perforation inner walls are coated with a dark, light-scattering material.

2. The perforated soft contact lens of claim 1 wherein the coating material is a fast dark colored dye.

3. The perforated soft contact lens of claim 1 wherein the lens is a hydrophilic material and the perforation is coated with silver sulfide or elemental silver.

4. The perforated soft contact lens of claim 1 wherein the lens is a hydrophillic material and the perforation is coated with black elemental bismuth pigment.

5. The method of making a perforated soft contact lens which comprises the steps of making a contact lens of desired size and shape, perforating said lens in the optical zone at a distance from 0 to 3.5 mm from the center of said lens and coating the surface of said perforation with a dark, light-scattering material which is compatible with the eye and selected from the group consisting of metal salts, pigments and fast, dark dyes.

* * * * *